(12) United States Patent
Lin et al.

(10) Patent No.: US 8,325,227 B2
(45) Date of Patent: Dec. 4, 2012

(54) METHOD AND APPARATUS FOR LOW COST MOTION DETECTION

(75) Inventors: Peng Lin, Pleasanton, CA (US); Todd Sachs, Palo Alto, CA (US)

(73) Assignee: Aptina Imaging Corporation, George Town (KY)

( * ) Notice: Subject to any disclaimer, the term of this patent is extended or adjusted under 35 U.S.C. 154(b) by 1176 days.

(21) Appl. No.: 12/173,327

(22) Filed: Jul. 15, 2008

(65) Prior Publication Data

US 2010/0013919 A1 Jan. 21, 2010

(51) Int. Cl.
*H04N 7/18* (2006.01)

(52) U.S. Cl. ... 348/143; 348/149; 348/155; 375/240.02; 375/240.24

(58) Field of Classification Search .......... 348/143–149, 348/155; 375/240.02–240.24
See application file for complete search history.

(56) References Cited

U.S. PATENT DOCUMENTS

| | | | | |
|---|---|---|---|---|
| 5,610,580 A | * | 3/1997 | Lai | 340/541 |
| 5,682,205 A | * | 10/1997 | Sezan et al. | 348/452 |
| 5,986,695 A | * | 11/1999 | Choi | 348/155 |
| 6,157,677 A | | 12/2000 | Martens et al. | |
| 6,937,651 B1 | * | 8/2005 | Brill et al. | 375/240 |
| 6,963,377 B2 | * | 11/2005 | Del Corso | 348/558 |
| 7,643,056 B2 | * | 1/2010 | Silsby | 348/155 |
| 7,929,613 B2 | * | 4/2011 | Kamijo et al. | 375/240.24 |
| 2002/0159101 A1 | * | 10/2002 | Alderson et al. | 358/504 |
| 2003/0206584 A1 | * | 11/2003 | Morita et al. | 375/240.02 |
| 2004/0212678 A1 | * | 10/2004 | Cooper et al. | 348/155 |
| 2004/0260177 A1 | * | 12/2004 | Simopoulos | 600/437 |
| 2006/0092280 A1 | * | 5/2006 | Kamijo et al. | 348/169 |
| 2006/0203311 A1 | * | 9/2006 | Weng et al. | 358/516 |
| 2006/0250501 A1 | * | 11/2006 | Widmann et al. | 348/148 |
| 2006/0290806 A1 | * | 12/2006 | MacInnis | 348/448 |
| 2007/0108978 A1 | * | 5/2007 | MacFarlane et al. | 324/318 |
| 2008/0111889 A1 | * | 5/2008 | Fujita et al. | 348/208.5 |
| 2009/0039235 A1 | * | 2/2009 | MacFarlane et al. | 250/206.1 |
| 2009/0096879 A1 | * | 4/2009 | Motomura et al. | 348/208.6 |

FOREIGN PATENT DOCUMENTS

WO   WO/02082545 A1   10/2002

OTHER PUBLICATIONS

Jeonghun Kim et al., "A portable surveillance camera architecture using one-bit motion detection", vol. 53, pp. 1254-1259, Nov. 2007.

* cited by examiner

*Primary Examiner* — Wing Chan
*Assistant Examiner* — Razu Miah
(74) *Attorney, Agent, or Firm* — David C. Kellogg

(57) ABSTRACT

A non-frame-based motion detection method and apparatus for imagers requires only a few line buffers and little computation. The non-frame-based, low cost motion detection method and apparatus are well suited for "system-a-chip" (SOC) imager implementations.

28 Claims, 4 Drawing Sheets

METHOD AND APPARATUS FOR LOW COST MOTION DETECTION

FIELD OF THE INVENTION

Embodiments of the invention relate to imagers and more particularly to motion detection for imagers.

BACKGROUND

FIG. 1 shows an example surveillance system 10 having a video camera 12, a controller 14, an alarm system 16 and a recording device 18. The camera 12 includes an imager for capturing a viewed scene and a motion detection feature, which outputs a motion signal to the controller 14 when motion is detected in the scene viewed by the camera 12. Motion detection is a desirable feature in security applications. An immediate benefit of including a motion detection feature in the camera 12 is that the feature helps save recording space by only activating the video recording device 18 (and/or only sending the detected moving region to an encoder for compression) when motion is detected. Another benefit of motion detection is that it allows the camera 12 to send an alert to the security personal in the viewing room causing them to focus on the specific area where motion has been detected. This is especially useful when there are many monitors in the viewing room that are connected to many different cameras, such as e.g., in a casino viewing room. The alarm system 16 could also be triggered by the controller 14 when motion is detected by the camera 12.

Conventional motion detection algorithms use temporal processing that compares an image of the current frame with a reference frame image and then counts the number of pixels that are different between the frames. This type of motion detection technique, however, requires a large frame buffer and, therefore, cannot easily be implemented in system-on-a-chip (SOC) imager systems, which have limited memory resources and general circuit area limitations. Moreover, the large frame memory adds cost to the imager, which is also undesirable.

Accordingly, there exists a need for an improved method and system for motion detection within an imager. There further exists a need for a motion detection system and method that may be implemented in a system-on-a-chip imager system.

DETAILED DESCRIPTION

Figure 1:
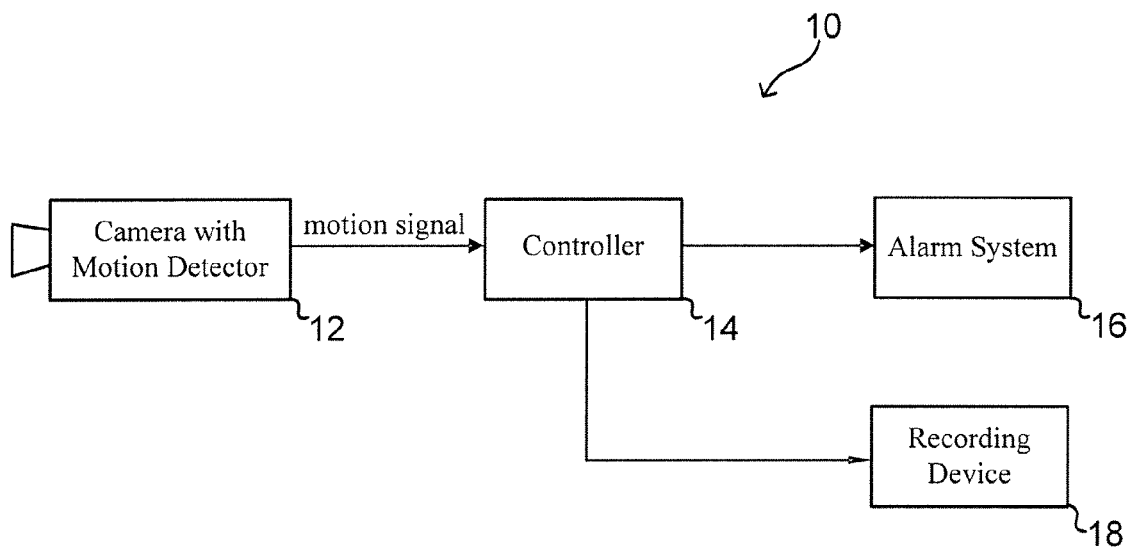
FIG. 1 illustrates an example surveillance system.
Figure 2:
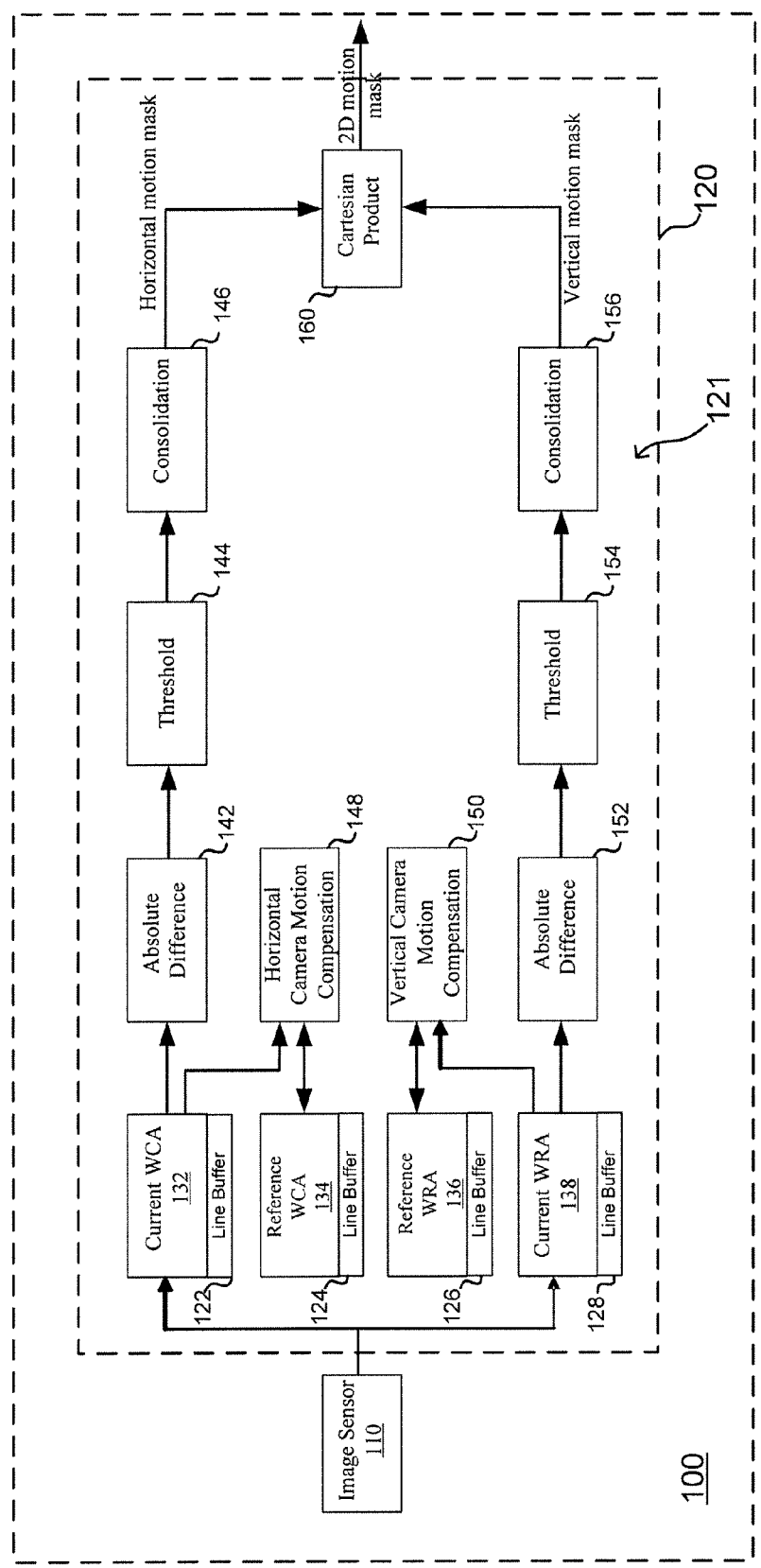
FIG. 2 illustrates an imager (e.g., a system-on-a-chip imager) having non-frame-based motion detection logic/circuitry in accordance with an example embodiment disclosed herein.

Referring to the figures, where like reference numbers designate like elements, FIG. 2 illustrates an imager (e.g., a system-on-a-chip imager) 100 having non-frame-based motion detection circuit 120 in accordance with an example embodiment disclosed herein. Since motion detection is not frame-based, a large and expensive frame buffer memory is not required. This is beneficial because it reduces memory requirements, used circuit area and the cost of the imager 100. Accordingly, the imager 100 is suitable for a system-on-a-chip implementation. In one embodiment, the imager 100 is implemented in a video camera 12 (FIG. 1) such that the camera 12 has non-frame-based motion detection as described below. It should be appreciated that the imager 100 can also be implemented in a digital still camera (or other camera), which can be operated to take multiple images over a period of time (e.g., one or more images per second).

The imager 100 comprises an image sensor 110 and the motion detection circuit 120. The image sensor 110 outputs digital data (e.g., pixel data) representing the image captured by the sensor 110 to the motion detection circuit 120. The image sensor 110 can be a CMOS image sensor, CCD image sensor or other suitable imaging device capable of imaging a scene and outputting a digital representation (i.e., digital image data) of the imaged scene. The digital representation is typically processed by an image processor within the imager before being output as a digital image. CMOS imagers, e.g., are generally known as discussed, for example, in U.S. Pat. Nos. 6,140,630, 6,376,868, 6,310,366, 6,326,652, 6,204,524 and 6,333,205, assigned to Micron Technology, Inc. Suitable CCD and other imagers are also known in the art.

The motion detection circuit 120 includes four line buffers 122, 124, 126, 128 instead of a frame buffer memory used in prior art motion detection techniques. The line buffers 122, 124, 126, 128 are respectively associated with a current weighted column average (WCA) process 132, a reference WCA process 134, a reference weighted row average (WRA) process 136 and a current WRA process 138. Additional processing included in the motion detection circuit 120 include: two absolute difference processes 142, 152, threshold processes 144, 154, consolidation processes 146, 156, a Cartesian product process 160, a horizontal camera motion compensation process 148 and a vertical camera motion compensation process 150, which are described in more detail below. The processes 132, 134, 136, 138, 142, 144, 146, 148, 150, 152, 154, 156, 160 can be performed in logic circuit 121 or a processor included in the motion detection circuit 120.

As set forth above, the illustrated embodiment eliminates the frame buffer used for storing the reference frame used in prior motion detection systems. Certain information from the reference frame, however, is still needed because motion detection is essentially a temporal process requiring comparison of current information to reference information. Accordingly, the illustrated embodiment represents the current image data and reference data in a compact way so that the amount of data is reduced while the key information needed for motion detection is retained. As can be seen, at most, only four line buffers 122, 124, 126, 128 are required to implement the disclosed motion detection processing.

This reduction in memory results from the use of weighted row averages and weighted column averages to represent the reference and current image frames in a compact manner. This way, two-dimensional image data (i.e., row by column data) is reduced to two lines of one-dimensional data (i.e., row only and column only). Instead of using a frame buffer to store an array of reference frame data, the illustrated embodiment uses only two line buffers 124, 126 to store separate one-dimensional lines of reference data. Likewise, only two line buffers 122, 128 are required to store the one-dimensional current image weighted row and weighted column averages. At the beginning of the disclosed motion detection procedure only the weighted row and column average data of the reference frame are computed and stored. The stored reference weighted row and weighted column average data can be updated as needed during the procedure.

Let f(x,y) denote a video frame. The weighted row average, denoted by $A_{row}(f)(y)$, is defined in equation (1) as follows:

$$A_{row}(f)(y) = \frac{\sum_{x=0}^{x=width-1} w_x \cdot f(x, y)}{\sum_{x=0}^{x=width-1} w_x}, \quad (1)$$

where "width" is the number of columns in the image frame. The weighted column average, denoted by $A_{col}(f)(x)$, is defined in equation (2) as follows:

$$A_{col}(f)(x) = \frac{\sum_{y=0}^{y=height-1} v_y \cdot f(x, y)}{\sum_{y=0}^{y=height-1} v_y}, \quad (2)$$

where "height" is the number of rows in the image frame.

Figure 3:
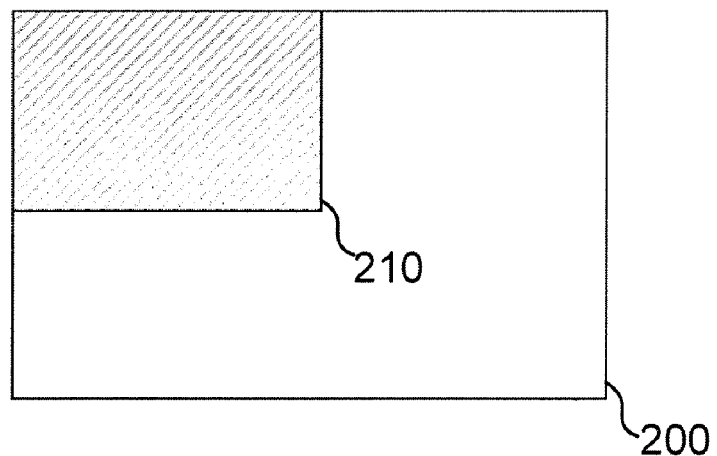
FIG. 3 illustrates an example of detecting motion in a particular area within a frame using weighting.

Typically, the weights $w_x$ and $v_y$ are set to 1 such that the values of all pixels in the frame are used to compute the weighted row and column averages. The advantage of using weighted averages is that they provide the flexibility of specifying a particular area of interest to monitor for motion detection. For example, an area of interest can be defined by setting the weights for pixels within the area of interest to '1' and setting the weights of the remaining pixels of the frame to '0'. FIG. 3 illustrates an example frame 200 in which the left-most upper quadrant is an area of interest 210 is to be monitored for motion detection. As set forth above, weights $w_x$ and $v_y$ are set to 1 for pixels within the area of interest 210, while the weights $w_x$ and $v_y$ for all other pixels are set to 0.

Figure 4:
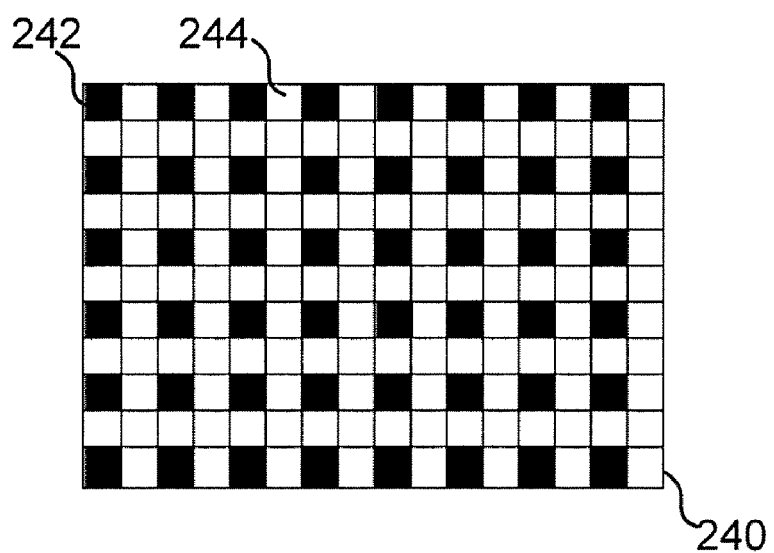
FIG. 4 illustrates an example of detecting motion using sub-sampling.

In another embodiment, sub-sampled image data (without actually sub-sampling the image) can be used in the motion detection process. To sub-sample the image data, non-zero weights $w_x$ and $v_y$ are used for a sample of pixels 242 (shown as shaded pixels for illustrative purposes only) in the image frame 240 while all of the weights $w_x$ and $v_y$ for the remaining pixels 244 are set to '0' (as shown in FIG. 4). It should be appreciated that sub-sampling can further reduce the amount of required line buffer memory by at least a half.

The weighted column averages are used to detect horizontal motion, if any. Let $f_c(x,y)$ denote the current frame, and $f_r(x,y)$ denote the reference frame. Then the current frame weighted column average is $A_{col}(f)(x)$, which is computed in the current WCA process 132 using equation (2), and the reference frame weighted column average is $A_{col}(f_r)(x)$, which is computed in the reference WCA process 134 using equation (2). The computed current frame weighted column average is stored in line buffer 122 while the computed reference frame weighted column average is stored in line buffer 124. That is, the entire frames are not stored in the circuit 120.

Before detecting horizontal motion, it is desirable to estimate and compensate for any horizontal camera movement because the motion detection feature disclosed herein is interested in object motion within the imaged scene, not camera motion. The horizontal camera motion is estimated in the horizontal camera motion compensation process 148. In process 148, the SAD (sum of absolute difference) defined in equation (3) below is minimized with respect to the parameter s within a certain range. Although not to be taken as limiting the disclosed embodiment, in a desired embodiment, the range for s is [−16,+16].

$$SAD_H(s) = \sum_{x=0}^{x=width-1} |A_{col}(f_c)(x) - A_{col}(f_r)(x+s)| \quad (3)$$

The minimization can be achieved by performing an exhaustive search of s within its range. The value of s that minimizes the $SAD_H(S)$ in equation (3), denoted herein as $s_0$, represents the horizontal camera motion. To compensate for this horizontal camera motion, the reference frame weighted column average stored in line buffer 124 is shifted by $s_0$, i.e., $A_{col}(f_r)(x+s_0)$. The shifted reference frame weighted column average can be stored in line buffer 124, replacing the prior reference frame weighted column average, for subsequent use as described below. Alternatively, parameter $s_0$ can be stored or passed onto subsequent processing without having to replace the reference frame weighted column average already stored in line buffer 124. It should be appreciated that the horizontal camera motion compensation process 148 (and the vertical camera motion compensation process 150) can be skipped if the imager 100 is securely mounted, or otherwise not subject to any motion, if desired.

As discussed below in more detail, the illustrated embodiment detects horizontal motion by generating a horizontal motion mask. Once the horizontal camera motion has been compensated for in process 148, the horizontal motion detection process continues at absolute difference process 142. Absolute difference process 142 computes the absolute difference $D_H(x)$ between the weighted column average of the current frame, $A_{col}(f_c)(x)$, and the horizontal camera motion compensated weighted column average of the reference frame, $A_{col}(f_r)(x+s_0)$, as shown below in equation (4):

$$D_H(x) = |A_{col}(f_c)(x) - A_{col}(f_r)(x+s_0)| \quad (4)$$

The absolute difference $D_H(x)$ is input by threshold process 144, which thresholds the difference $D_H(x)$ to create a thresholded absolute difference $M_H(x)$ according to equation (5):

$$M_H(x) = \begin{cases} 1, & \text{if } D_H(x) > T_H \\ 0, & \text{otherwise} \end{cases} \quad (5)$$

The threshold $T_H$ can be determined before hand based on common motion detection principles or it may be an application specific threshold $T_H$. It should be appreciated that how the threshold $T_H$ is set does not limit the disclosed embodiments. Once the thresholded absolute difference $M_H(x)$ is computed, the consolidation process 146 applies morphology-like operators such as closing and opening to respectively fill out small gaps and eliminate small segments in $M_H(x)$ to generate the final horizontal motion mask $\tilde{M}_H(x)$ that consists of significant non-zero connected components.

The weighted row averages discussed above are used to detect vertical motion, if any. Let $A_{row}(f_c)(y)$ and $A_{row}(f_r)(y)$ be the weighted row averages for the current frame and the reference frame, respectively, which are respectively computed in processes 138 and 136 using equation (1) discussed above. The computed current frame weighted row average is stored in line buffer 128 while the computed reference frame weighted row average is stored in line buffer 126.

Similar to the horizontal motion detection, it is desirable to estimate and compensate for any vertical camera motion before performing vertical motion detection. The vertical camera motion is estimated in the vertical camera motion compensation process 150. In process 150, the SAD (sum of absolute difference) defined in equation (6) below is minimized with respect to the parameter t within a certain range. Although not to be taken as limiting the disclosed embodiment, in a desired embodiment, the range for t is [−16,+16].

$$SAD_V(t) = \sum_{y=0}^{y=height-1} |A_{row}(f_c)(y) - A_{row}(f_r)(y+t)| \quad (6)$$

The minimization can be achieved by performing an exhaustive search of t within its range. The value of t that minimizes the $SAD_V(t)$ in equation (6), denoted herein as $t_0$, represents the vertical camera motion. To compensate for this vertical camera motion, the reference frame weighted row average stored in line buffer 126 is shifted by $t_0$, i.e., $A_{row}(f_r)(y+t_0)$. The shifted reference frame weighted row average can be stored in line buffer 126, replacing the prior reference frame weighted row average, for subsequent use as described below. Alternatively, parameter $t_0$ can be stored or passed onto subsequent processing without having to replace the reference frame weighted row average already stored in line buffer 126.

As discussed below in more detail, the illustrated embodiment detects vertical motion by generating a vertical motion mask. Once the vertical camera motion has been compensated for in process 150, the vertical motion detection process continues at absolute difference process 152. Absolute difference process 152 computes the absolute difference $D_V(y)$ between the weighted row average of the current frame, $A_{row}(f_c)(y)$, and the vertical camera motion compensated weighted row average of the reference frame, $A_{row}(f_r)(y+t_0)$, as shown below in equation (7):

$$D_V(y) = |A_{row}(f_c)(y) - A_{row}(f_r)(y+t_0)| \quad (7)$$

The absolute difference $D_V(y)$ is input by threshold process 154, which thresholds the difference $D_V(y)$ to create a thresholded absolute difference $M_V(y)$ according to equation (8):

$$M_V(y) = \begin{cases} 1, & \text{if } D_V(y) > T_V \\ 0, & \text{otherwise} \end{cases} \quad (8)$$

The threshold $T_V$ can be determined before hand based on common motion detection principles or it may be an application specific threshold $T_V$. It should be appreciated that how the threshold $T_V$ is set does not limit the disclosed embodiments. Once the thresholded absolute difference $M_V(y)$ is computed, consolidation process 156 applies morphology-like operators such as closing and opening to respectively fill out small gaps and eliminate small segments in $M_V(y)$. Then, a step of connecting all of the non-zero connected components in $M_V(y)$ is performed to generate the final vertical motion mask $\tilde{M}_V(y)$ that consists of one large non-zero connected component.

The Cartesian product process 160 inputs the horizontal and vertical motion masks $\tilde{M}_H(x)$, $\tilde{M}_V(y)$ and computes and outputs a two-dimensional (2D) motion mask $M_{2D}(x,y)$. The 2D motion mask $M_{2D}(x,y)$ is computed using the Cartesian product of the horizontal motion mask $\tilde{M}_H(x)$ and the vertical motion mask $\tilde{M}_V(y)$ as set forth in equation (9):

$$M_{2D}(x,y) = \tilde{M}_H(x) \times \tilde{M}_V(y) \quad (9)$$

The 2D motion mask $M_{2D}(x,y)$ indicates where motion occurred within a frame, with a e.g., a value of '1' indicating motion and value of 0 indicating no motion. The 2D motion mask $M_{2D}(x,y)$ may be output from the imager 100 (FIG. 1) and used by a controller 14 (FIG. 1) or other system component to e.g., trigger an alarm, turn on a recording device, etc. based on the detected motion.

When the motion detection process starts, the data from the first captured frame is used as the reference data described above. As can be appreciated, the reference information will need to be updated periodically and/or aperiodically. The rules for updating the reference information may include: a) updating the reference information every T minutes (i.e., periodic update), where T is application specific; and/or b) updating the reference information when the detected motion area becomes greater than a predefined portion of the whole frame area (e.g., ⅔ of the whole frame area) (i.e., an aperiodic update). Updating the reference information merely requires overwriting the prior reference data with the newly calculated weighted row and column averages.

In comparison to the prior art frame-based motion detection algorithms, the disclosed non-frame-based motion detection method and apparatus only requires a few line buffers (four line buffers or less if sub-sampling is used) of memory instead of a whole frame buffer memory. Moreover, because the above-mentioned processing is performed on one-dimensional data, the computations of the disclosed motion detection method is very fast and inexpensive to implement in comparison to other motion detection systems.

Figure 5:
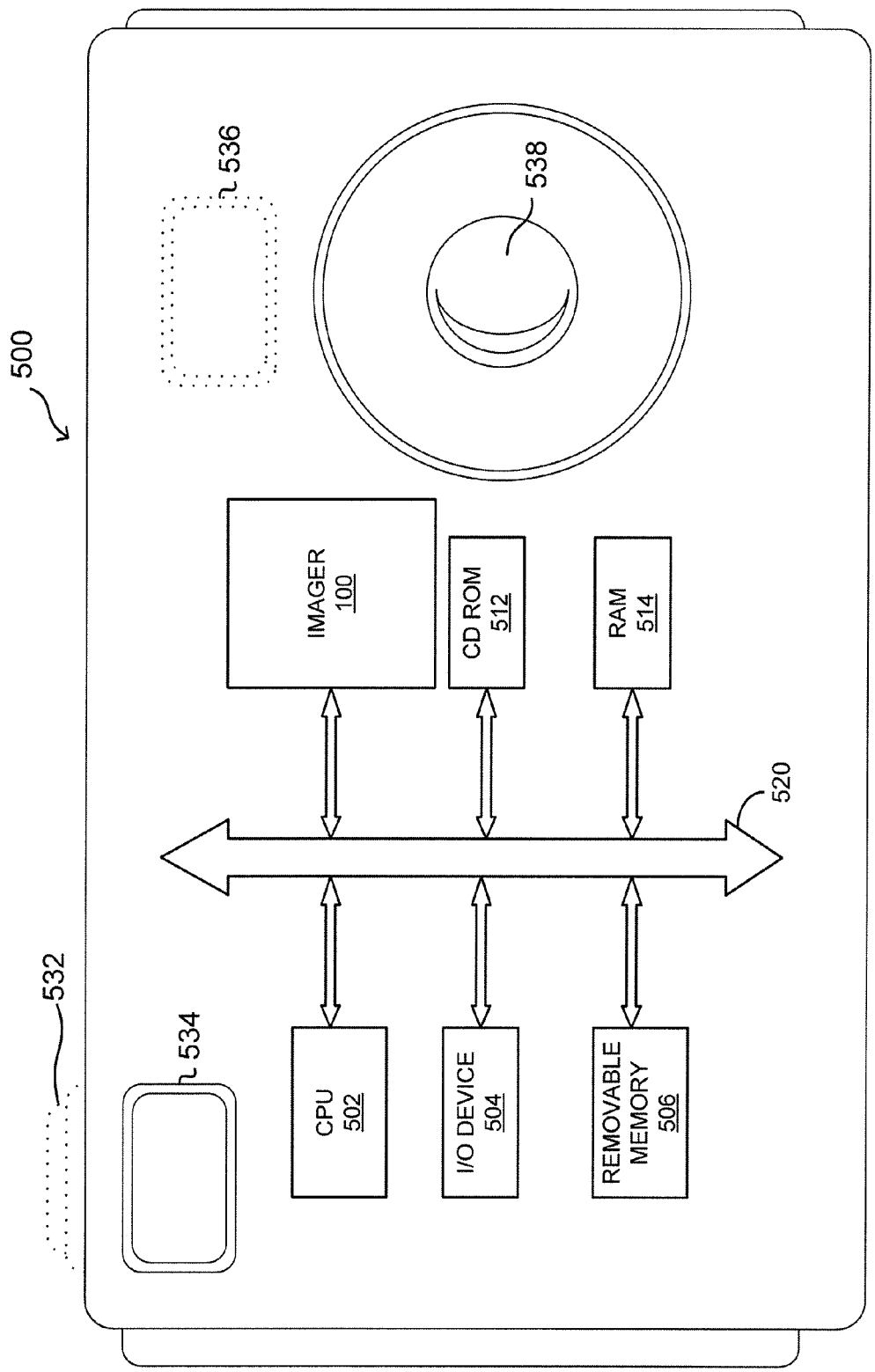
FIG. 5 shows a processor system incorporating at least one imaging device constructed in accordance with an embodiment disclosed herein.

FIG. 5 shows a processor system 500 incorporating at least one imager 100 constructed and operated in accordance with an embodiment disclosed herein. In a surveillance video system embodiment, the processor system 500 could, for example be a video camera comprising a view finder 534 and a lens system 538 for focusing an image on the pixel array of the imager 100. The video camera could be activated to continuously image scenes and to perform motion detection as described herein. In another embodiment, the processor system 500 could, for example be a digital still camera comprising a shutter release button 532, the view finder 534, a flash 536 and the lens system 538 for focusing an image on the pixel array of the imager 100. In a handheld video system embodiment, the system 500 would be a video camera with the addition of a start/stop record button instead of the shutter release button 532.

The system 500 generally also comprises a central processing unit (CPU) 502, for example, a microprocessor for controlling functions and which communicates with one or more input/output devices (I/O) 504 over a bus 520. The CPU 502 also exchanges data with random access memory (RAM) 514 over the bus 520, typically through a memory controller. The camera system 500 may also include peripheral devices such as a removable memory 506, which also communicates with CPU 502 over the bus 520. In the case of a computer system, the system 500 could also include a CD ROM drive 512. Other processor systems which may employ imagers 100 containing motion detection as described herein, besides still and video cameras, include computers, PDAs, cellular telephones, scanners, machine vision systems, and other systems requiring imaging applications in response to motion detection.

The above description and drawings illustrate various embodiments It should be appreciated that modifications, though presently unforeseeable, of these embodiments that

What is claimed as new and desired to be protected by Letters Patent of the United States is:

1. A method of detecting motion of an object in a first image, said method comprising:
    using a motion detection circuit, determining weighted row and column averages of a reference image;
    using the motion detection circuit, determining weighted row and column averages of the first image;
    using the motion detection circuit, detecting motion of the object based on the determined weighted column and row averages of the reference image and the first image;
    using the motion detection circuit, shifting the weighted row average of the reference image to compensate for vertical movement of an imager that captured the first image; and
    using the motion detection circuit, shifting the weighted column average of the reference image to compensate for horizontal movement of the imager.

2. The method of claim 1, wherein the detecting motion step comprises:
    using the motion detection circuit, creating a vertical motion mask based on the determined weighted row average of the first image and the shifted weighted row average of the reference image;
    using the motion detection circuit, creating a horizontal motion mask based on the determined weighted column average of the first image and the shifted weighted column average of the reference image; and
    using the motion detection circuit, combining the vertical and horizontal motion masks to create a two-dimensional motion mask comprising at least one portion indicative of motion of the object.

3. The method of claim 1 further comprising the step of, using the motion detection circuit, updating the weighted row and column averages of the reference image on a periodic basis.

4. The method of claim 1 further comprising the step of, using the motion detection circuit, updating the weighted row and column averages of the reference image on an aperiodic basis.

5. The method of claim 4, wherein the weighted row and column averages of reference image are updated when a detected motion area becomes greater than a predefined portion of the first image.

6. The method of claim 1, wherein the weighted row and column averages are weighted to detect motion of the object in an area of interest.

7. The method of claim 1, wherein the weighted row and column averages are weighted to detect motion of the object from sub-sampled portions of the first and reference images.

8. A method of detecting motion of an object in a first image, said method comprising:
    using a motion detection circuit, determining weighted row and column averages of a reference image;
    using the motion detection circuit, determining weighted row and column averages of the first image; and
    using the motion detection circuit, detecting motion of the object based on the determined weighted column and row averages of the reference image and the first image, wherein the detecting motion step comprises:
    using the motion detection circuit, creating a vertical motion mask based on the determined weighted row averages of the first and reference images;
    using the motion detection circuit, creating a horizontal motion mask based on the determined weighted column average of the first and reference images; and
    using the motion detection circuit, combining the vertical and horizontal motion masks to create a two-dimensional motion mask comprising at least one portion indicative of motion of the object.

9. The method of claim 8, wherein the combining step comprises, using the motion detection circuit, performing a Cartesian product of the vertical and horizontal motion masks.

10. The method of claim 8, wherein the horizontal motion mask creating step comprises:
    using the motion detection circuit, determining an absolute difference of the weighted column averages of the first image and the reference image;
    using the motion detection circuit, thresholding the absolute difference based on a predetermined threshold; and
    using the motion detection circuit, performing a consolidation process on the thresholded absolute difference to create the horizontal motion mask.

11. The method of claim 8, wherein the vertical motion mask creating step comprises:
    using the motion detection circuit, determining an absolute difference of the weighted row averages of the first image and the reference image;
    using the motion detection circuit, thresholding the absolute difference based on a predetermined threshold;
    using the motion detection circuit, performing a consolidation process on the thresholded absolute difference; and
    using the motion detection circuit, connecting non-zero connected components in the consolidated thresholded absolute difference to create the vertical motion mask.

12. A motion detection circuit comprising:
    a plurality of line buffers, a first line buffer for storing a weighted row average of a reference image, a second line buffer for storing a weighed row average of a first image, a third line buffer for storing a weighted column average of the reference image and a fourth line buffer for storing a weighted column average of the first image; and
    logic for detecting motion of an object in the first image by computing and storing the weighted row and column averages of the reference and first images and detecting the motion of the object based on the determined weighted column and row averages of the reference and first images, wherein said logic shifts the weighted row average of the reference image to compensate for vertical movement of an imager that captured the first image and shifts the weighted column average of the reference image to compensate for horizontal movement of the imager.

13. The motion detection circuit of claim 12, wherein the logic detects motion of the object by:
    creating a vertical motion mask based on the determined weighted row average of the first image and the shifted weighted row average of the reference image;
    creating a horizontal motion mask based on the determined weighted column average of the first image and the shifted weighted column average of the reference image; and
    combining the vertical and horizontal motion masks to create a two-dimensional motion mask comprising at least one portion indicative of motion of the object.

14. The motion detection circuit of claim 12, wherein said logic updates the weighted row and column averages of the reference image on a periodic basis.

15. The motion detection circuit of claim 12, wherein said logic updates the weighted row and column averages of the reference image when a detected motion area becomes greater than a predefined portion of the first image.

16. The motion detection circuit of claim 12, wherein the weighted row and column averages are weighted to detect motion of the object in an area of interest.

17. The motion detection circuit of claim 12, wherein the weighted row and column averages are weighted to detect motion of the object from sub-sampled portions of the first and reference images.

18. A motion detection circuit comprising:
a plurality of line buffers, a first line buffer for storing a weighted row average of a reference image, a second line buffer for storing a weighed row average of a first image, a third line buffer for storing a weighted column average of the reference image and a fourth line buffer for storing a weighted column average of the first image; and
logic for detecting motion of an object in the first image by computing and storing the weighted row and column averages of the reference and first images and detecting the motion of the object based on the determined weighted column and row averages of the reference and first images, wherein the logic detects motion of the object by:
creating a vertical motion mask based on the determined weighted row averages of the first and reference images;
creating a horizontal motion mask based on the determined weighted column average of the first and reference images; and
combining the vertical and horizontal motion masks to create a two-dimensional motion mask comprising at least one portion indicative of motion of the object.

19. The motion detection circuit of claim 18, wherein the logic combines the horizontal and vertical motion masks by performing a Cartesian product of the vertical and horizontal motion masks.

20. The motion detection circuit of claim 18, wherein the logic creates the horizontal motion mask by:
determining an absolute difference of the weighted column averages of the first image and the reference image;
thresholding the absolute difference based on a predetermined threshold; and
performing a consolidation process on the thresholded absolute difference to create the horizontal motion mask.

21. The motion detection circuit of claim 18, wherein the logic creates the vertical motion mask by:
determining an absolute difference of the weighted row averages of the first image and the reference image;
thresholding the absolute difference based on a predetermined threshold;
performing a consolidation process on the thresholded absolute difference; and
connecting non-zero connected components in the consolidated thresholded absolute difference to create the vertical motion mask.

22. An imager comprising:
an image sensor for capturing a reference image and a first image and for outputting digital reference image data and first image data; and
a motion detection circuit connected to input the reference image data and the first image data, said circuit comprising:
a plurality of line buffers, a first line buffer for storing a weighted row average of the reference image, a second line buffer for storing a weighed row average of the first image, a third line buffer for storing a weighted column average of the reference image and a fourth line buffer for storing a weighted column average of the first image; and
a processor programmed to perform motion of an object in the first image, said processor performing a first process to compute and store the weighted row average of the reference image, a second process to compute and store the weighted column average of the reference image, a third process to compute and store the weighted row average of the first image, a fourth process to compute and store the weighted column average of the first image, and a fifth process for detecting the motion of the object based on the determined weighted column and row averages of the reference and first images, wherein the processor performs a sixth process for shifting the weighted row average of the reference image to compensate for vertical movement of the image sensor and a seventh process for shifting the weighted column average of the reference image to compensate for horizontal movement of the image sensor.

23. The imager of claim 22, wherein the weighted row and column averages are weighted to detect motion of the object in an area of interest.

24. The imager of claim 22, wherein the weighted row and column averages are weighted to detect motion of the object from sub-sampled portions of the first and reference images.

25. The imager of claim 22, wherein said processor updates the weighted row and column averages of the reference image on a periodic basis and when a detected motion area becomes greater than a predefined portion of the first image.

26. An imager comprising:
an image sensor for capturing a reference image and a first image and for outputting digital reference image data and first image data; and
a motion detection circuit connected to input the reference image data and the first image data, said circuit comprising:
a plurality of line buffers, a first line buffer for storing a weighted row average of the reference image, a second line buffer for storing a weighed row average of the first image, a third line buffer for storing a weighted column average of the reference image and a fourth line buffer for storing a weighted column average of the first image; and
a processor programmed to perform motion of an object in the first image, said processor performing a first process to compute and store the weighted row average of the reference image, a second process to compute and store the weighted column average of the reference image, a third process to compute and store the weighted row average of the first image, a fourth process to compute and store the weighted column average of the first image, and a fifth process for detecting the motion of the object based on the determined weighted column and row averages of the reference and first images, wherein the fifth process comprises:

a process for creating a vertical motion mask based on the determined weighted row averages of the first and reference images;

a process for creating a horizontal motion mask based on the determined weighted column average of the first and reference images; and a process for combining the vertical and horizontal motion masks to create a two-dimensional motion mask comprising at least one portion indicative of motion of the object.

27. An imager comprising:

an image sensor for capturing a reference image and a first image and for outputting digital reference image data and first image data; and a motion detection circuit connected to input the reference image data and the first image data, said circuit comprising:

a plurality of line buffers, a first line buffer for storing a weighted row average of the reference image, a second line buffer for storing a weighed row average of the first image, a third line buffer for storing a weighted column average of the reference image and a fourth line buffer for storing a weighted column average of the first image; and a processor programmed to perform motion of an object in the first image, said processor performing a first process to compute and store the weighted row average of the reference image, a second process to compute and store the weighted column average of the reference image, a third process to compute and store the weighted row average of the first image, a fourth process to compute and store the weighted column average of the first image, and a fifth process for detecting the motion of the object based on the determined weighted column and row averages of the reference and first images, wherein the weighted row average $A_{row}(f)(y)$ of the reference image or first image is computed according to $$A_{row}(f)(y) = \frac{\sum_{x=0}^{x=width-1} w_x \cdot f(x, y)}{\sum_{x=0}^{x=width-1} w_x},$$

where f(x,y) is the reference image or the first image, width is the number of columns in the reference image or the first image, and $w_x$ is an integer.

28. An imager comprising:

an image sensor for capturing a reference image and a first image and for outputting digital reference image data and first image data; and a motion detection circuit connected to input the reference image data and the first image data, said circuit comprising:

a plurality of line buffers, a first line buffer for storing a weighted row average of the reference image, a second line buffer for storing a weighed row average of the first image, a third line buffer for storing a weighted column average of the reference image and a fourth line buffer for storing a weighted column average of the first image; and a processor programmed to perform motion of an object in the first image, said processor performing a first process to compute and store the weighted row average of the reference image, a second process to compute and store the weighted column average of the reference image, a third process to compute and store the weighted row average of the first image, a fourth process to compute and store the weighted column average of the first image, and a fifth process for detecting the motion of the object based on the determined weighted column and row averages of the reference and first images, wherein the weighted column average $A_{col}(f)(x)$ of the reference image or first image is computed according to $$A_{col}(f)(x) = \frac{\sum_{y=0}^{y=height-1} v_y \cdot f(x, y)}{\sum_{y=0}^{y=height-1} v_y},$$

where f(x,y) is the reference image or the first image, height is the number of rows in the reference image or the first image, and $v_y$, is an integer.

* * * * *